United States Patent [19]

Tanoue et al.

[11] Patent Number: 5,138,247
[45] Date of Patent: Aug. 11, 1992

[54] REACTIVE POWER COMPENSATING APPARATUS WITH HIGHER HARMONIC SUPPRESSING FUNCTION

[75] Inventors: Yoshirou Tanoue, Hachioji; Akira Kawaguchi, Tokorozawa, both of Japan

[73] Assignee: Kabushiki Kaisha Toshiba, Kawasaki, Japan

[21] Appl. No.: 760,364

[22] Filed: Sep. 16, 1991

[30] Foreign Application Priority Data

Sep. 18, 1990 [JP] Japan .................................. 2-248214

[51] Int. Cl.$^5$ .............................................. G05F 1/70
[52] U.S. Cl. ........................................ 323/207; 363/95
[58] Field of Search .................... 323/205, 207; 363/95

[56] References Cited

U.S. PATENT DOCUMENTS

| | | | |
|---|---|---|---|
| 3,900,792 | 8/1975 | Moltgen | 323/207 |
| 3,968,422 | 7/1976 | Waldmann | 323/207 |
| 4,019,124 | 4/1977 | Moltgen | 323/207 |
| 4,570,214 | 2/1986 | Tanaka | 323/207 |
| 4,647,837 | 3/1987 | Stemmler | 323/207 |
| 4,752,726 | 6/1988 | Aoyama | 323/207 |

Primary Examiner—Peter S. Wong
Attorney, Agent, or Firm—Foley & Lardner

[57] ABSTRACT

Higher harmonic power components and fundamental wave reactive power components are derived from a load voltage and current, using theory (instantaneous p-q theory) regarding instantaneous real power and instantaneous imaginary power. Gains are then obtained which make the higher harmonic power components and fundamental wave reactive power components not exceed predetermined limit values. The higher harmonic power components and fundamental wave reactive power components are respectively multiplied by the gains to obtain limited higher harmonic power components and fundamental wave reactive power components. An output current command is generated in accordance with the limited higher harmonic power components and fundamental wave reactive power components. The output current command is supplied to an inverter which in turn supplies a compensation current to the power system.

6 Claims, 3 Drawing Sheets

REACTIVE POWER COMPENSATING APPARATUS WITH HIGHER HARMONIC SUPPRESSING FUNCTION

FIELD OF THE INVENTION

The present invention relates to a reactive power compensating apparatus having a higher harmonic suppressing function.

BACKGROUND OF THE INVENTION

There has been already proposed a compensating apparatus for compensating reactive current components and higher harmonic components of a load current of a power system by connecting an inverter to the power system to supply a compensation current thereto. FIG. 1 shows a current command calculating apparatus in such a compensating apparatus, used with an inverter for In FIG. 1, in accordance with a load current $i_L$ of a power system detected by a current detector (not shown) and a system voltage $V_s$, i.e., in accordance with a so-called instantaneous p-q theory, a PQ calculation circuit 3 as a power vector calculation circuit calculates an instantaneous real power P and an instantaneous imaginary power Q. The instantaneous p-q theory is described in detail in "Generalized Theory of Instantaneous Reactive Power and its Application" by Hirofumi AKAGI, et al. Papers B of the Institute of Electrical Engineers of Japan, Vol. 103, No. 7, pp. 483 to 490 (1983).

A power calculation circuit 4 derives components to be compensated, from an output of the PQ calculation circuit 3. The power calculation circuit 4 derives higher harmonic active power components $P_h$, fundamental wave reactive power components $Q_o$, and higher harmonic reactive power components $Q_h$ from the instantaneous real power P and instantaneous imaginary power Q. In accordance with the derived components $P_h$, $Q_o$, and $Q_h$, and the system voltage $V_s$, an inverse PQ calculation circuit 6 as an inverse calculation circuit calculates a current command $i_c^*$ which is expressed by $$i_c^* = \sqrt{P_h^2 + (Q_o + Q_h)^2} / V_s \quad (1)$$

An absolute value limiter 7 clamps the current command $i_c^*$ to such a magnitude that makes an output of a compensation current supplying inverter not exceed its rated value. The clamped current command $i_c^{*'}$ is supplied to the inverter.

Since the absolute value limiter 7 shown in FIG. 7 clamps the $i_c^*$ to such a current command $i_c^{*'}$, that makes an inverter output current not exceed its rated value, there occurs wave saturation, i.e., distortion caused by wave clamping, posing the problem that the current command $i_c^{*'}$, includes higher harmonics.

FIG. 2 is a block diagram showing another conventional current command calculating apparatus. Instead of the absolute value limiter 7 shown in FIG. 1, a peak detector 16, inverse function calculation circuit 17c, and multiplier 19 are used to configure a so-called auto-gain-control circuit. The current command $i_c^*$ outputted from the inverse PQ calculation circuit 6 is supplied to the multiplier 19 as one input thereof, and is also supplied to the peak detector 16. The peak detector 16 detects and holds the peak value of the current command $i_c^*$. The inverse function calculation circuit 17c calculates a gain k if the peak value held by the peak detector 16 exceeds a rated value of the inverts. The gain k is determined through an inverse function calculation so that the current command does not exceed the inverter rated value. The calculated gain k is supplied to the multiplier 19 as the other input thereof. The multiplier 19 multiplies the current command $i_c^*$ by the gain k to output the current command $i_c^{*'}$, to the inverter.

In this auto-gain-control circuit shown in FIG. 2, higher harmonic components and fundamental wave reactive power components are uniformly limited. Therefore, even if either the higher harmonic components or the fundamental wave reactive power components exceed a limit value, both the components are limited, thereby posing the problem that the performance of the inverter cannot be effectively used.

SUMMARY OF THE INVENTION

The present invention has been made to solve the above problems. It is an object of the present invention to provide a power compensating apparatus capable of suppressing an output current of a compensating inverter to within a rated value without generating higher harmonics otherwise caused by clamping a current command, and capable of effectively using the performance of the inverter.

In order to achieve the above object, the present invention provides a reactive power compensating apparatus having a higher harmonic suppressing function, the reactive power compensating apparatus being provided with: a power vector calculating circuit for calculating an instantaneous real power and an instantaneous imaginary power in accordance with a voltage and current of a load connected to a power system; a power calculating circuit for deriving higher harmonic active power components, fundamental wave reactive power components, and higher harmonic reactive power components from the instantaneous real power and instantaneous imaginary power calculated by the power vector calculating circuit; a limiter for limiting the magnitudes of the higher harmonic active and reactive power components and fundamental wave reactive power components derived by the power calculating circuit, to values equal to or lower than the respective limit values; an inverse power vector calculating circuit for calculating an output current command value in accordance with the higher harmonic active and reactive power components limited by the limiter and the load voltage; and an inverter for supplying an output current controlled by the output current command value to the power system as a compensation current.

EMBODIMENTS OF THE INVENTION

Figure 1:
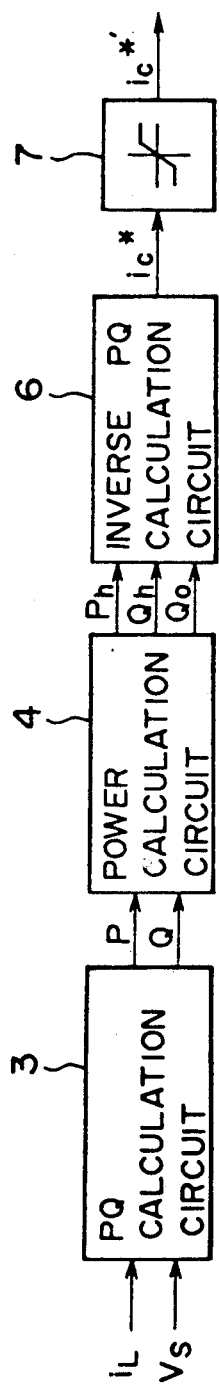
FIG. 1 shows a conventional current command calculating apparatus having an absolute value limiter.
Figure 2:
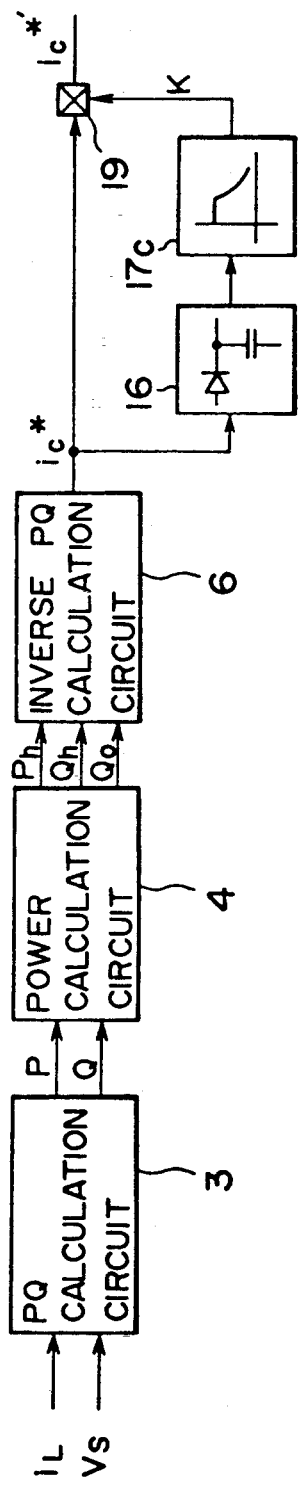
FIG. 2 shows another conventional current value command calculating apparatus having an auto-gain-control circuit.
Figure 3:
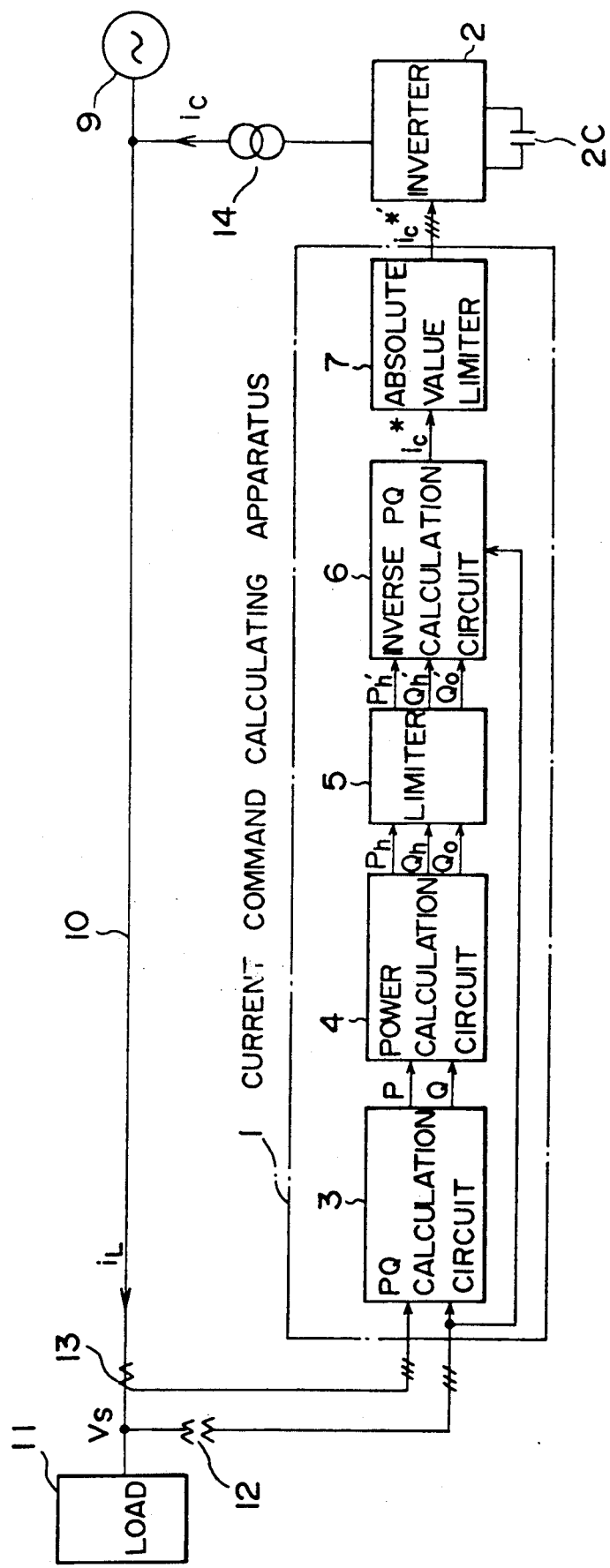
FIG. 3 shows a power compensating apparatus having a current command calculating apparatus according to an embodiment of the present invention.

FIG. 3 shows the structure of an embodiment according to the present invention. In FIG. 3, like elements to those shown in FIG. 1 are represented by using identical reference numerals.

Referring to FIG. 3, a load current is supplied from a power source 9 to a load 11 via a power system bus 10. On the load side of the power system bus 10, a system voltage $V_s$ is detected by a voltage detector 12, and a load current $i_L$ is detected by a current detector 13. In accordance with the load current $i_L$ detected by the current detector 13 and the system voltage $VV_s$ detected by the voltage detector 12, a current command calculating apparatus 1 calculates a current command $i_c^*$, for a compensation current $i_c$. The compensation current $i_c$ generated, in accordance with the current command, by an inverter 2 having a capacitor 2C connected between d.c. terminals, is supplied via a transformer 14 to the power system bus 10 in order to compensate for fundamental reactive current components, higher harmonic active current components, and higher harmonic reactive current components, respectively contained in the load current $i_L$.

The current command calculating apparatus 1 has a PQ calculation circuit 3, power calculation circuit 4, inverse PQ calculation circuit 6, and absolute value limiter 7, similar to a conventional apparatus. A different point from a conventional apparatus is that a limiter 5 is connected between the power calculation circuit 4 and an inverse PQ calculation circuit 6. This limiter 5 limits the magnitudes of higher harmonic components $P_h$ and $Q_h$ and fundamental wave power components $Q_o$ derived by the power calculation circuit 4 to predetermined limit values. The detailed structure of the limiter 5 is shown in FIG. 4.

Figure 4:
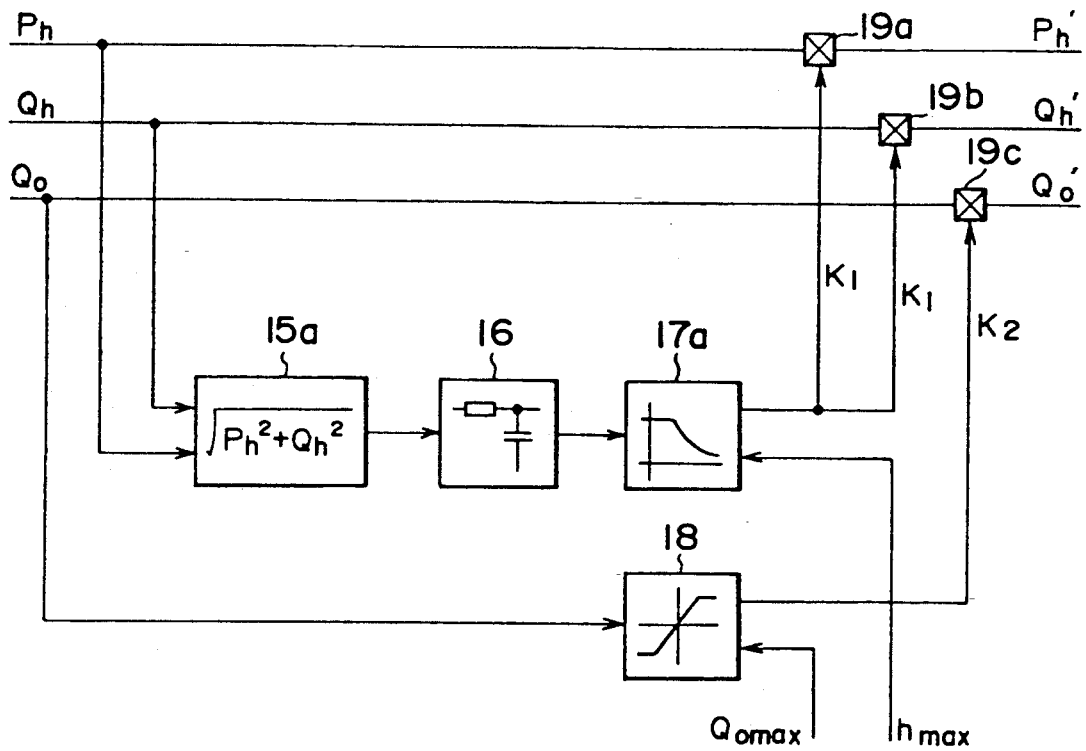
FIG. 4 is a block diagram showing the current command calculating apparatus of the power compensating apparatus shown in FIG. 3.

Referring to FIG. 4, a vector absolute value calculation circuit 15a receives the higher harmonic components $P_h$ and $Q_h$ and calculates a higher harmonic power $W_h$ which is given by $$W_h = \sqrt{P_h^2 + Q_h^2} \tag{2}$$

A peak detector 16 is connected to the output of the vector absolute value calculation circuit 15a, the peak detector 16 detecting and holding the peak value of the higher harmonic power $W_h$. An inverse function calculation circuit 17a is connected to the output of the peak detector 16. The inverse function calculation circuit 17a calculates a gain $k_1$ for limiting the higher harmonic power $W_h$ to a limit value $h_{max}$ if the power $W_h$ is judged as exceeding the limit value $h_{max}$. There is also provided an absolute value limiter 18 which receives the fundamental wave reactive power components $Q_o$, and sets a gain $k_2$ for limiting the value of the fundamental wave reactive power components $Q_o$ to a limit value $Q_{omax}$. There are also provided three multipliers 19a, 19b, and 19c which receive the higher harmonic components $P_h$ and $Q_h$, and fundamental wave reactive power components $Q_o$ as their one inputs, and the gains $k_1$, $k_1$, and $k_2$ obtained from the inverse function calculation circuit 17a and absolute value limiter 18 as their other inputs. Higher harmonic components $P_h'$ and $Q_h'$ outputted from the multipliers are supplied to the inverse calculation circuit 6.

The operation of the embodiment apparatus constructed as above will be described below.

The power calculation circuit 4 calculates the higher harmonic components $P_h$ and $Q_h$ and fundamental wave reactive power components $Q_o$. The vector absolute value calculation circuit 15a calculates the magnitude of the higher harmonic power $W_h$. The peak detector 16 detects and holds the peak value of the higher harmonic power. The inverse function calculation circuit 17a calculates the gain $k_1$ for limiting the higher harmonic power $W_h$ to the limit value $h_{max}$ if the higher harmonic power $W_h$ is judged, from the peak value of the higher harmonic power $W_h$ held by the peak detector 16, as the higher harmonic power $h$ exceeds the limit value $h_{max}$. The absolute value limiter 18 receives the fundamental wave reactive power components $Q_o$ and sets the gain $k_2$ for limiting the magnitude of the fundamental wave reactive power components $Q_o$ to the limit value $Q_{omax}$ if it exceeds the limit value $Q_{omax}$. The multipliers 19a, 19b, and 19c multiply the higher harmonic components $P_h$ by the gain $k_1$, the higher harmonic components $Q_h$ by the gain $k_1$, and the fundamental wave reactive power components $Q_o$ by the gain $k_2$, to obtain the higher harmonic components $P_h'$ and $Q_h'$ and fundamental wave reactive power components $Q_o'$ which are then supplied to the inverse PQ calculation circuit 6. The limit value $h_{max}$ for the higher harmonic power and the limit value $h_{omax}$ for the fundamental wave reactive power components are properly determined from the rated value of a compensation inverter, the load condition, and the like. The limit values may not be necessarily set to fixed values, but they may be dynamically changed in accordance with the load condition and running condition. In the above manner, the higher harmonic components $P_h'$ and $Q_h'$ as the higher harmonic power command and the fundamental wave reactive power components $Q_o'$ as the fundamental wave reactive power command can be maintained equal to or lower than the limit values.

By using the higher harmonic components $P_h'$ and $Q_h'$ and fundamental wave reactive power components $Q_o'$ obtained by the limiter 5, the inverse PQ calculation circuit calculates the output current command $i_c^*$ which is given by $$i_c^* = \sqrt{(P_h')^2 + (Q_o' + Q_h')^2} / V_s \tag{3}$$

The calculated output current command $i_c^*$ considers the limit values for the higher harmonic components and fundamental wave reactive power components, independently from each other. Therefore, it can be said theoretically that if the output current $i_c$ of the inverter 2 is controlled by the output current command $i_c^*$ calculated by the equation (3), and if the sum of the upper limits of the higher harmonic power command value and the fundamental wave reactive power command value are set to within the apparatus rated values, then the output current $i_c$ will not exceed the apparatus rated value.

In the embodiment shown in FIG. 3, the absolute value limiter 7 is provided between the inverse PQ calculation circuit 6 and inverter 2. This absolute value limiter 7 is not necessarily required, but it is provided as a backup means of the limiter 5 for any trouble of the limiter 5. The limiter 7 operates in a similar manner to the limiter 7 shown in FIG. 1 so that it outputs an output current command $i_c^*$, to limit the output current $i_c$ of the inverter 2.

Figure 5:
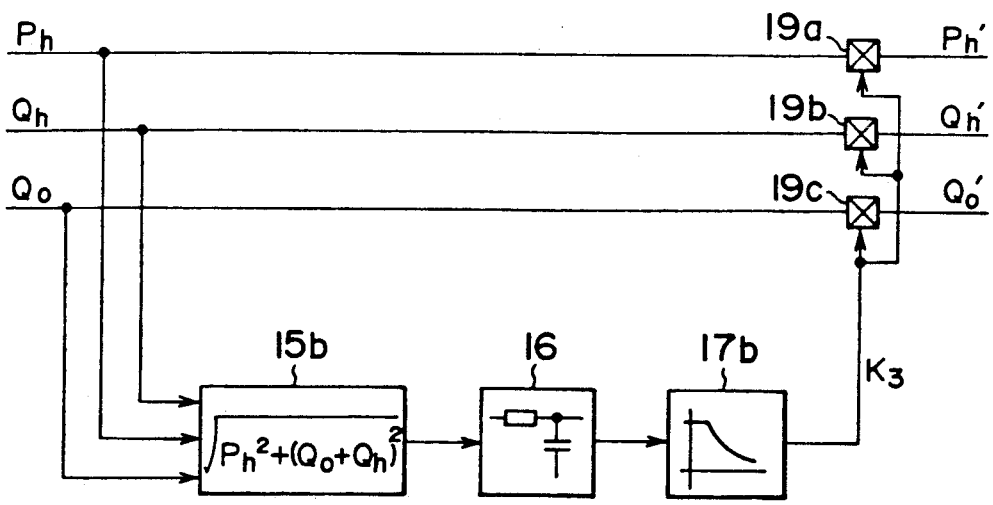
FIG. 5 is a block diagram showing a limiter different from that in the current command calculating apparatus of the power compensating apparatus shown in FIG. 3.

FIG. 5 shows another structure of the limiter 5. This limiter 5 does not process the higher harmonic power components and fundamental wave reactive power components separately, but a vector absolute value calculation circuit 15b calculates the higher harmonic power components $W_c$ to be compensated, in accordance with the higher harmonic components $P_h$ and $Q_h$ and the fundamental wave reactive power components $Q_o$. The higher harmonic power components $W_c$ is given by $$W_C = \sqrt{P_h^2 + (Q_o + Q_h)^2} \quad (4)$$

The peak value of the higher harmonic power components is detected and held by the peak detector 16. An inverse function calculation circuit 17b calculates a common gain $k_3$ for limiting the inverter output power to a value supplied to the multipliers 19a, 19b, and 19c as common one inputs thereof. The limiter 5 constructed as shown in FIG. 5 can also maintain the output current command $i_c^*$, to a value equal to or smaller than a predetermined value.

As appreciated from the foregoing description of the present invention, the output current command does not include higher harmonic components otherwise caused by clamping the current command, and in addition it is possible to suppress an output compensation current of the inverter to within a rated value. Furthermore, by limiting the higher harmonic components and the fundamental wave reactive components separately (FIG. 4), the performance of the apparatus can be effectively used.

What is claimed is:

1. A reactive power compensating apparatus having a higher harmonic suppressing function, comprising:
   power vector calculating means for calculating an instantaneous real power and an instantaneous imaginary power in accordance with a voltage and current of a load connected to a power system;
   power calculating means for deriving higher harmonic active power components, fundamental wave reactive power components, and higher harmonic reactive power components from said instantaneous real power and instantaneous imaginary power calculated by said power vector calculating means;
   a limiter for limiting the magnitudes of said higher harmonic active and reactive power components and fundamental wave reactive power components derived by said power calculating means, to values equal to or lower than respective limit values;
   inverse power vector calculating means for calculating an output current command value in accordance with said higher harmonic active and reactive power components limited by said limiter and said load voltage; and
   an inverter for supplying an output current controlled by said output current command value to said power system as a compensation current.

2. An apparatus according to claim 1, wherein said limiter limits the magnitudes of said higher harmonic active and reactive power components and fundamental wave reactive power components derived by said power calculating means, by using different gains.

3. An apparatus according to claim 2, wherein said limiter comprises:
   vector absolute value calculating means for calculating a higher harmonic power from said higher harmonic active and reactive power components and fundamental wave reactive power components derived by said power calculating means;
   peak detecting means for detecting and holding the peak value of said higher harmonic power;
   inverse function calculating means for calculating a first gain for said higher harmonic active power components and higher harmonic reactive power components for limiting said peak value to a value equal to or smaller than a predetermined value;
   means for calculating said limited higher harmonic components by multiplying said higher harmonic active and reactive power components by said first gain;
   an absolute value limiter for setting a second gain for limiting said fundamental wave reactive power components derived by said power calculating means to a predetermined value; and
   means for calculating said limited fundamental wave reactive power components by multiplying said fundamental wave reactive power components by said second gain.

4. An apparatus according to claim 1, wherein said limiter limits the magnitudes of said higher harmonic active and reactive power components and fundamental wave reactive power components derived by said power calculating means, by using a same gain.

5. An apparatus according to claim 4, wherein said limiter comprises:
   vector absolute value calculating means for calculating a power to be compensated, in accordance with said higher harmonic active power components, fundamental wave reactive power components, and higher harmonic reactive power components, respectively derived by said power calculating means;
   peak detecting means for detecting and holding the peak value of said compensation power calculated by said vector absolute value calculating means;
   inverse function calculating means for calculating a gain for limiting said peak value of said compensation power to a value equal to or smaller than a predetermined value; and
   means for calculating said limited higher harmonic active power components and higher harmonic reactive power components by multiplying said higher harmonic active power components, fundamental wave reactive power component, and higher harmonic reactive power components by said third gain.

6. An apparatus according to claim 1, wherein an absolute value limiter is connected between said inverse power vector calculating means and inverter, said absolute value limiter limiting said output current command value to a value equal to or smaller than a predetermined value.

* * * * *